(12) United States Patent
Cohen et al.

(10) Patent No.: US 12,254,279 B1
(45) Date of Patent: Mar. 18, 2025

(54) DYNAMIC RESOURCE ALLOCATION OF LARGE LANGUAGE MODEL DEPLOYMENTS FOR CONVERSATIONAL INTERFACE

(71) Applicant: Honesty Innovations Holdings, LLC, Deerfield Beach, FL (US)

(72) Inventors: Seth Cohen, Southwest Ranches, FL (US); Heather Widler, Melbourne, FL (US); John A. Torres, Kissimmee, FL (US); John D. Doak, Tulsa, OK (US)

(73) Assignee: HONESTY INNOVATIONS HOLDINGS, LLC, Deerfield Beach, FL (US)

( * ) Notice: Subject to any disclaimer, the term of this patent is extended or adjusted under 35 U.S.C. 154(b) by 0 days.

(21) Appl. No.: 18/672,689

(22) Filed: May 23, 2024

(51) Int. Cl.
  *G06F 40/35* (2020.01)
  *G06F 9/445* (2018.01)

(52) U.S. Cl.
  CPC .......... *G06F 40/35* (2020.01); *G06F 9/44536* (2013.01)

(58) Field of Classification Search
  CPC .... G10L 15/00; G10L 15/063; G10L 15/1815
  See application file for complete search history.

(56) References Cited

U.S. PATENT DOCUMENTS

| | | | |
|---|---|---|---|
| 6,684,196 B1 | 1/2004 | Mini et al. | |
| 8,650,049 B1 | 2/2014 | Davies et al. | |
| 8,793,147 B2 | 7/2014 | Bradshaw et al. | |
| 9,495,700 B2 | 11/2016 | Hoch et al. | |
| 9,760,871 B1 * | 9/2017 | Pourfallah | G06Q 10/10 |
| 9,812,151 B1 | 11/2017 | Amini et al. | |
| 9,996,881 B2 | 6/2018 | Mdeway | |
| 10,295,356 B1 | 5/2019 | Cope et al. | |
| 10,296,982 B1 | 5/2019 | Bernico et al. | |
| 11,302,312 B1 * | 4/2022 | Soni | G10L 15/07 |
| 2002/0120554 A1 | 8/2002 | Vega | |
| 2002/0169702 A1 | 11/2002 | Eaton et al. | |
| 2007/0078700 A1 | 4/2007 | Lenzmann et al. | |
| 2007/0094072 A1 | 4/2007 | Vidals et al. | |

(Continued)

FOREIGN PATENT DOCUMENTS

| | | |
|---|---|---|
| CA | 2979627 | 3/2018 |
| KR | 20190051904 | 5/2019 |

(Continued)

OTHER PUBLICATIONS

Ielafris; https://www.elafris.com/for-agents/; 2019.

*Primary Examiner* — Michael Colucci
(74) *Attorney, Agent, or Firm* — Cozen O'Connor

(57) ABSTRACT

A dynamic conversation interface system includes a plurality of instances of a large language model (LLM) engine, each instance being configured according to a respective set of system directives. An agent manager engine instantiates and configures the instances of the LLM engine such that a first LLM engine instance is configured according to a first set of system directives, and a second LLM engine instance is configured according to a second set of system directives that is different from the first set. The first LLM engine instance has a different functional specialization from the second LLM engine instance, and the two instances engage in a same conversation session with a user to perform different specializations within that conversation session.

19 Claims, 7 Drawing Sheets

(56) References Cited

U.S. PATENT DOCUMENTS

| | | |
|---|---|---|
| 2009/0257566 A1 | 10/2009 | Dixon |
| 2010/0070307 A1 | 3/2010 | Sinvhal-Sharma |
| 2010/0228568 A1 | 9/2010 | Atlee et al. |
| 2011/0213625 A1 | 9/2011 | Joao |
| 2014/0032246 A1 | 1/2014 | Bhatt et al. |
| 2014/0372150 A1 | 12/2014 | Karle et al. |
| 2016/0098298 A1 | 4/2016 | Trefler et al. |
| 2016/0111112 A1* | 4/2016 | Hayakawa .............. G10L 17/02 704/239 |
| 2016/0246966 A1 | 8/2016 | Batrouni |
| 2017/0161758 A1 | 6/2017 | Towriss |
| 2017/0365008 A1 | 12/2017 | Schreier et al. |
| 2018/0165586 A1 | 6/2018 | Saxena et al. |
| 2018/0191884 A1 | 7/2018 | Goldgraber et al. |
| 2018/0204111 A1 | 7/2018 | Zadeh et al. |
| 2018/0336048 A1 | 11/2018 | Zarlengo et al. |
| 2019/0035040 A1 | 1/2019 | Goel |
| 2019/0095582 A1 | 3/2019 | Waits |
| 2019/0138996 A1 | 5/2019 | Salvi et al. |
| 2019/0171351 A1 | 6/2019 | Kilchenko et al. |
| 2019/0205727 A1 | 7/2019 | Lin et al. |
| 2020/0020165 A1 | 1/2020 | Tran |
| 2020/0135187 A1* | 4/2020 | Chao .................... G10L 15/1822 |
| 2021/0046975 A1 | 2/2021 | Zemskov et al. |
| 2022/0310109 A1* | 9/2022 | Donsbach ............. G06F 3/0481 |
| 2022/0375259 A1* | 11/2022 | Banerjee ................ G06V 40/45 |
| 2023/0403357 A1* | 12/2023 | Ezell ................... H04M 3/4283 |
| 2024/0107083 A1* | 3/2024 | Coppelmans ....... H04M 3/5175 |
| 2024/0211693 A1* | 6/2024 | Mazor .................... G06F 40/30 |

FOREIGN PATENT DOCUMENTS

| | | |
|---|---|---|
| KR | 20190065840 | 6/2019 |
| WO | 2018209093 | 11/2018 |
| WO | 2019048941 | 3/2019 |

* cited by examiner

DYNAMIC RESOURCE ALLOCATION OF LARGE LANGUAGE MODEL DEPLOYMENTS FOR CONVERSATIONAL INTERFACE

TECHNICAL FIELD

The present subject matter relates generally to information technology and computer networks and, more particularly, to an architectural framework and algorithms that facilitate the practical use of a large-language model (LLM) as a conversational communications system, such as an automated customer-interface system supporting a multiplicity of concurrent conversations.

BACKGROUND

Recent advances in large language models (LLMs) have achieved impressive capabilities in conducting effective and informative conversations with human users. At present, there is rapidly-growing interest in adapting and focusing LLMs for use in specific applications, such as conversational systems for interacting with, and informing, customers or users in sales-pitch or customer-service scenarios. However, the task of training an LLM to effectively steer and manage complex conversations, particularly in scenarios such as presentations and interactive sales pitches that involve multiple threads within specific topics, presents a multitude of challenges.

One of the foremost challenges in training LLMs for complex conversation steering is maintaining context and continuity over extended dialogues. For example, the conversation often weaves through various topics, necessitating the LLM to not only keep track of the current context but also to integrate past conversation threads seamlessly. This demands a sophisticated understanding of the dialogue's structure and objectives, and the ability to recall and connect relevant information from earlier in the conversation or from related topics, which can be particularly challenging given the limitations in the model's memory and attention mechanisms.

Another challenge lies in the model's ability to dynamically switch between topics and manage multiple threads within a conversation. In a sales pitch or presentation, the speaker may need to navigate through a series of interconnected topics, address questions, and return to the main thread without losing coherence. Training a LLM to perform these tasks requires advanced algorithms capable of understanding the hierarchical structure of conversations, identifying cues for topic shifts, and prioritizing which threads to follow or revisit at any given time.

Interpreting user intent and feedback accurately is crucial in steering conversations effectively. In complex discussions like sales pitches, the customer's responses, questions, or feedback can be subtle and nuanced. Moreover, tailoring each conversation to the customer's specific interests, background, and responses is essential for engagement, especially in sales and presentation contexts. The LLM should preferably be trained to recognize and adapt to different audience profiles, customize the content delivery, and engage participants in a manner that resonates with them personally. Training an LLM to discern these nuances, gauge the user's level of interest or understanding, and adapt the conversation accordingly is a formidable challenge. This requires the model to have a deep semantic understanding of language and the ability to infer intent from both direct and indirect cues. A trained and configured LLM having such capabilities would require substantial computing resources and its real-world performance may be perceived as sluggish.

Ensuring real-time responsiveness while maintaining high-quality output is a critical challenge, particularly when the system is deployed to handle multiple concurrent conversations. The computational demands of processing and generating responses in complex conversations, coupled with the need for immediate feedback and interaction, require highly optimized models and infrastructure. Scalability becomes a concern as the system must maintain its performance and accuracy across a potentially large number of simultaneous conversations, each with its own set of topics, threads, and user interactions.

Practical solutions are needed to address these, and other, challenges in purpose-built, and large-scale deployments of LLMs that are adapted for customer interaction.

SUMMARY OF THE DISCLOSURE

Some aspects of the disclosure are directed to a dynamic conversation interface system that implements a plurality of instances of a large language model (LLM) engine, wherein each LLM engine instance is configured according to a respective set of system directives. An agent manager engine instantiates and configures the instances of the LLM engine such that a first LLM engine instance is configured according to a first set of system directives, and a second LLM engine instance is configured according to a second set of system directives that is different from the first set. The first LLM engine instance may have a different functional specialization from the second LLM engine instance, and the first LLM engine instance and the second LLM engine instance may engage in a same conversation session with a user to perform different specializations within that conversation session.

The first set of system directives may include directives that determine occurrence of a defined condition for instantiating the second LLM engine instance, and the agent manager engine may instantiate the second LLM engine instance in response to the occurrence of the defined condition. The defined condition may be, for example, the start of a particular topic of discussion within the conversation. In another example, the defined condition may trigger a call to transfer of the conversation from a first LLM engine instance corresponding to a first LLM client entity to a second LLM engine instance corresponding to a second LLM client entity.

As a use-case example, the first set of system directives may define attributes of an agent of a first customer service organization, such as an agency that provides social-services information to its customers. The social-services information may include such information as government-provided benefits and qualification criteria for eligibility for such benefits. Such benefits may be financial public-assistance benefits, health insurance, etc.

a non-governmental resource and offboard the caller to that non-governmental resource.

The second LLM client entity may be a distinct, and different type, of customer service organization, such as a commercial (non-governmental) entity which provides insurance and alternative products to the benefits provided by, or in conjunction with, the first customer service organization.

Another use-case example is an automated agent assisting a municipal organization to provide consumer advocacy services or assistance with submission of applications for insurance or other benefits. For instance, cities and state agencies that include departments of insurance may implement an automated or semi-autonomous customer service system that answers general knowledge questions, receives complaints or benefit applications, and may adjudicate qualification for such benefits. Such a system may also accept calls via interactive voice response (IVR) for these uses and then provide details on In some use-case examples, the first set of system directives and the second set of system directives defines criteria for determining whether the user is qualified for certain benefits. Further, the first set of system directives or the second set of system directives may define a set of operations to be executed by the system in response to a determination that the user is not qualified for those benefits. In this case, the set of operations may include causing the system to communicatively connect the user with a second LLM instance of a different customer service organization during the same conversation session, which may offer alternative benefits or services.

Advantageously, in some aspects, personal information that was provided by the customer to the first LLM engine instance is not transferred to the second LLM instance, thereby providing isolation of personal or sensitive information across LLM client entities.

BRIEF DESCRIPTION OF THE DRAWINGS

The invention may be more completely understood in consideration of the following detailed description of various embodiments of the invention in connection with the accompanying drawings, in which.

Figure 1:
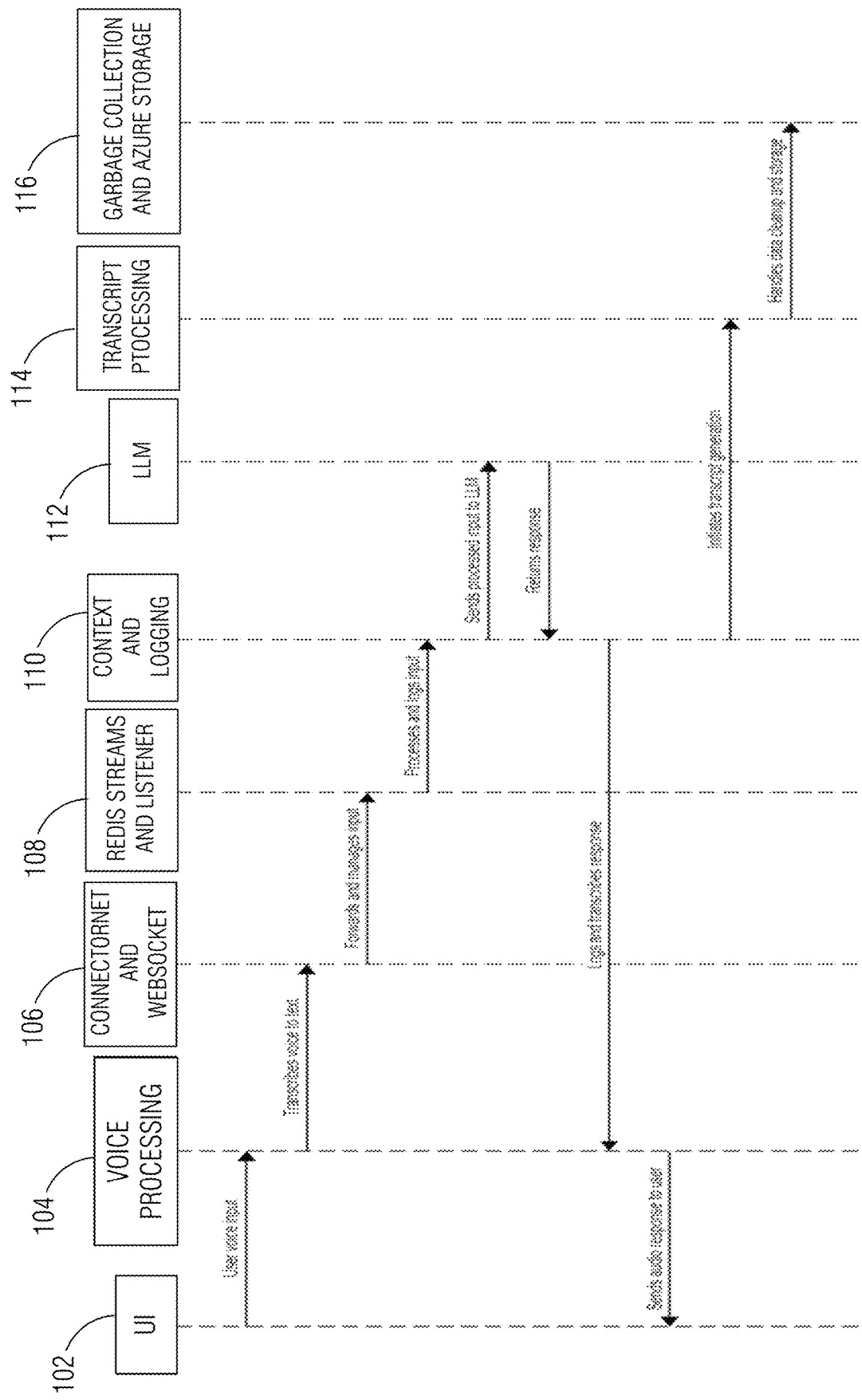
FIG. 1 is a high-level operational sequence diagram illustrating a simplified dynamic LLM conversational system according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION

Aspects of the embodiments are directed to a system architecture and for a dynamic LLM conversational interface that uses natural-language processing (NLP). An AI-linguistic-framework according to various embodiments outlines the systems and processes which are operative to enhance the conversational capabilities of Large Language Models (LLMs) in a dynamic and secure manner. In the present context a LLM is a computational system that embodies the intersection of computer science, artificial intelligence (AI), and linguistics. It is operative to understand, interpret, generate, and manipulate human language in a way that is both sophisticated and contextually relevant.

Although various implementations of LLMs are well-known, LLMs are the subject of major investment in their research and development and are rapidly evolving. The present subject matter utilizes LLMs but is not bound to any particular LLM architecture. Fundamentally, a LLM is built using deep neural networks, which comprises multiple layers of interconnected nodes or neurons. Each layer transforms its input data before passing it on to the next layer. Present-day LLMs often use the transformer architecture, which relies on self-attention mechanisms to weigh the influence of different parts of the input data, and hence consider the context of each word or token in the entire sequence. These mechanisms allow the model to focus on different parts of the input sequence when producing an output, enabling contextually aware language generation. It will be understood that aspects of the present invention may be adapted to work with any suitable LLM architecture, whether presently existing, or arising in the future.

It should also be noted that embodiments are described hereinbelow in the context of an automated customer-service or sales system for illustration. However, it will be understood that the principles described herein are more generally applicable for a diverse set of applications. Notably, systems according to some embodiments employ one or more LLM models in multiple instances to specialize in different aspects of a conversation flow, regardless of the higher-level objective of the conversation.

According to some embodiments, a conversation interface system has multiple LLM instances within a dynamically-variable system architecture. Each LLM instance is specially trained for its specific role within the conversation flow. Advantageously, this approach improves the system's performance over a single LLM instance that is trained for the entire conversation flow. One reason for this improvement is that a single LLM trained for all aspects of the conversation flow tends to be substantially larger (i.e., having more parameters) than any one of the specialized LLM instances. Training of the larger LLM to achieve a comparable level of performance at each aspect of the conversation flow to the performance of any one of the specialized LLMs (which is focused on the corresponding aspect of the conversation flow) is more difficult, and executing the larger LLM in its inference (output generation) mode is substantially more computationally intensive than executing any one of the specialized LLMs. In practice, for a given conversation, only one of the specialized LLMs needs to be instantiated at any point of that conversation, thus achieving a lower compute utilization than the larger LLM. Moreover, these computational advantages are compounded when the conversation interface system is supporting a multiplicity of different conversations with different users, callers, customers or participants (these terms may be used interchangeably herein; for brevity, "user" or "users" refers to any of these).

According to related embodiments, which are described in detail below, one or more agent manager engines instantiates, configures, and coordinates the operation, of distinct LLMs to carry out the conversation flow. In addition, the agent manager engine(s) can request function calls to interface the active LLM(s) with external services or data. The system architecture, which includes multiple specialized LLMs and agent manager engine(s) is dynamically autonomously adaptive, scalable, and well-suited for implementation in distributed computing environments, such as in cloud-based services.

Generally, the system includes various engines (including the LLMs and agent manager engine(s)), along with other engines as described below, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) (e.g., CPU, GPU) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

System Operational Overview

FIG. 1 is a high-level operational sequence diagram illustrating a simplified dynamic LLM conversational system according to some embodiments. As depicted, the system includes user interface engine 102, voice processing engine 104, ConnectorNet Python gateway and WebSocket connection engine 106, Redis streams and listener engine 108, conversation context buffer and Redis persistence engine 110, LLM engine 112, transcript processing engine 114, and garbage collection and Azure storage engine 116.

In operation, user interface engine 102 captures voice input from the user and initiates audio recording. In addition, user interface engine 102 includes a voice synthesizer to provide voice interactions to the user. Voice processing engine 104 is a service that transcribes the captured audio signal to a text signal for processing. In various implementations, voice processing engine 104 may be accessed via third-party API or it may be locally implemented.

ConnectorNet Python gateway and WebSocket connection engine 106 works to manage the transition of data from the transcription service to the listener engine 108 by handling data processing and routing using real-time data transfer capabilities and ensuring continuous and seamless communication between the Python gateway and Redis Streams.

Redis streams and listener engine 108 manages and categorizes inputs and outputs using stream keys and conversation IDs, and facilitates real-time message passing and data persistence. In addition, Redis streams and listener engine 108 provides asynchronous input processing to listen to Redis streams and processes incoming messages, including serializing the input for further processing.

Redis persistence engine 110 performs context and logging operations, including temporary storage of the input data in Redis streams and buffer memory to hold conversation context. These operations ensure data is held transiently during the conversation, with automatic discard post-conversation. Engine 110 also captures interactions, system logs, and user responses for tracking and auditing system processes.

LLM engine 112 provides access to a LLM service such as ChatGPT by OpenAI through its application programming interface (API). Using the LLM service, LLM engine 112 processes and generates responses based on the input and conversation context.

Transcript processing engine 114 receives the LLM's response and manages the return flow to the Redis streams. It transcribes text responses back to audio for user interaction.

Garbage collection and Azure storage engine 116 manages memory and resource cleanup post-conversation, and ensures secure and efficient disposal of temporary data. In addition, Garbage collection and Azure storage engine 116 uses Azure services for secure, encrypted storage of transcripts.

Figure 2A:
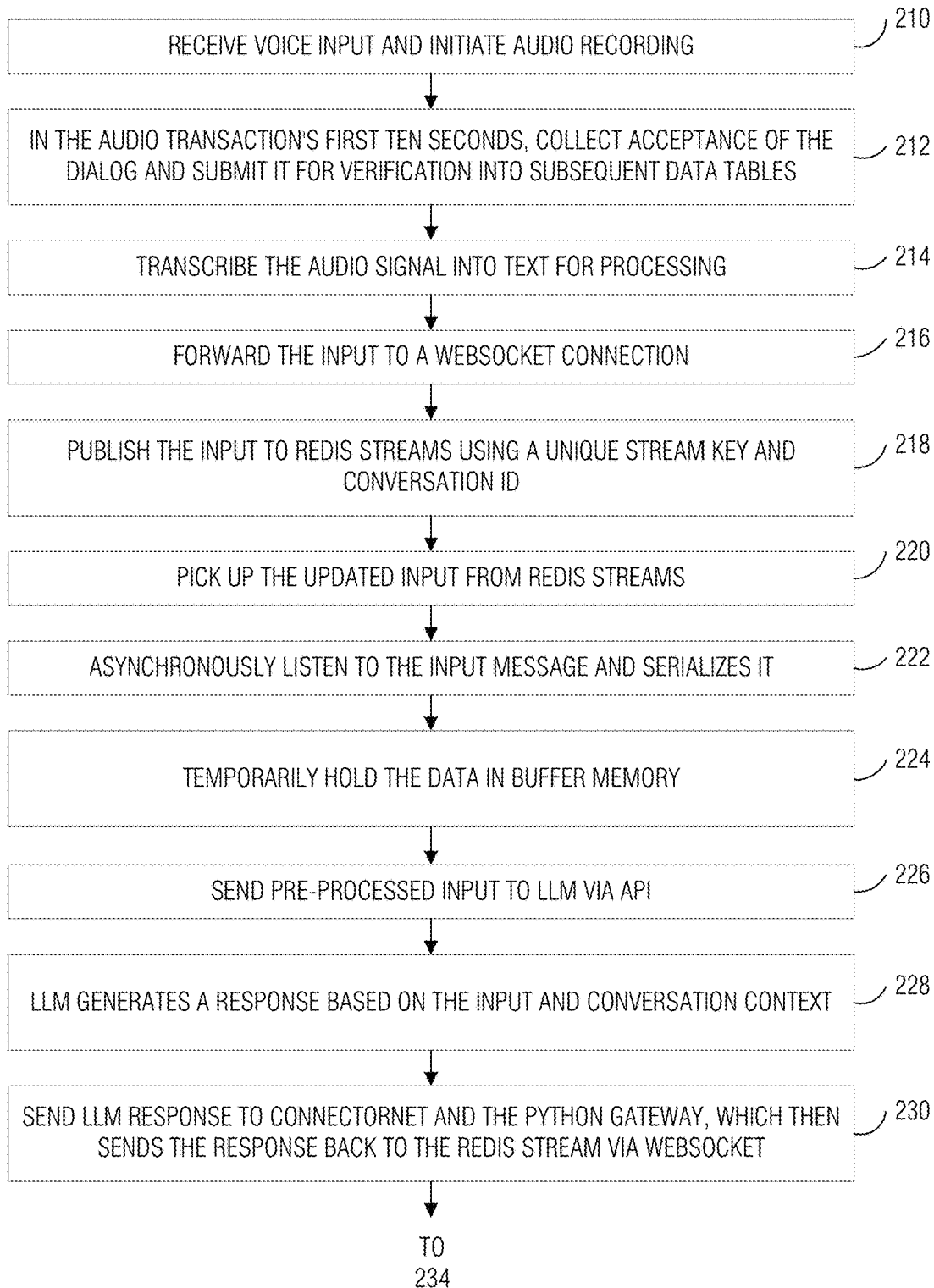
FIGS. 2A-2B is a flow diagram illustrating operation of a dynamic LLM conversational system in greater detail according to a related embodiment.
Figure 2B:
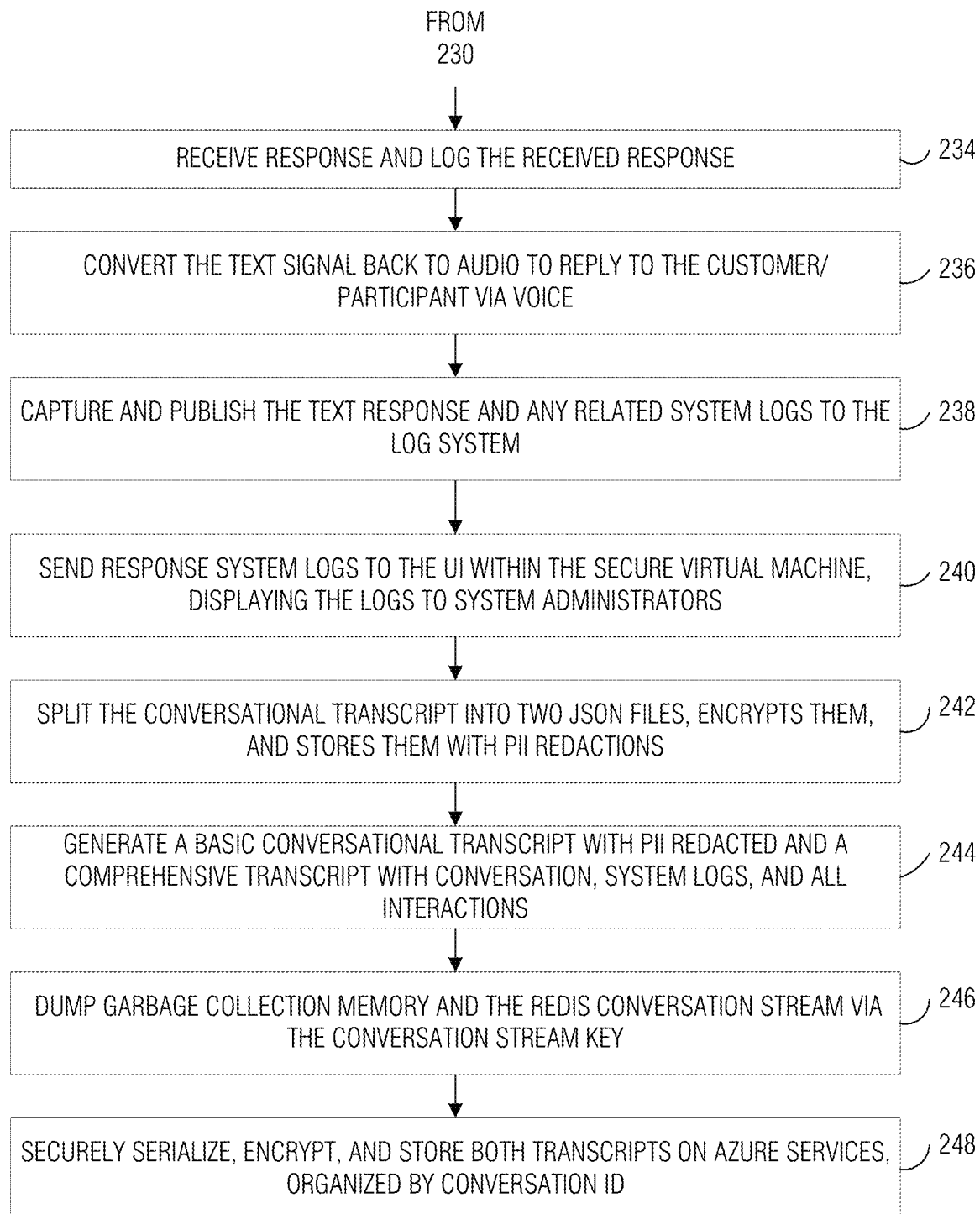

FIGS. 2A-2B is a flow diagram illustrating operation of a dynamic LLM conversational system in greater detail according to a related embodiment. At 210, the system receives user voice input which is provided by the user via a user interface. The user interface may be a telephone (e.g., voice-over Internet Protocol (VOIP), plain-old telephone system (POTS)), web-conference with audio or audio+video, or similar. The user input is recorded.

During the first ten seconds of the audio transaction, the system gathers acceptance of the dialog and submits it for verification into a subset of subsequent data tables. At 214, the audio signal is transcribed to text for processing. At 216, the Python gateway forwards input to a WebSocket connection. At 218, the input is published to Redis streams with a unique stream key and conversation ID.

At 220, a listener process receives the updated input from Redis streams. At 222, the listener listens asynchronously to the input message and serializes it. The logging system captures these interactions and system logs.

At 224, the data is held in the Redis streams and in the conversation buffer memory. When the conversation ends, the memory is permanently discarded.

At 226, the input (which is preprocessed at this point) is delivered to the LLM, which has been trained, and configured with directives. Configuration of the LLM using directives is described below. The user's response is logged before being processed by the LLM and logged.

At 228, the LLM generates a response based on the input and conversation context and returns the inferred response. At 230, the response is then sent to ConnectorNet and the Python Gateway which sends the response back to the Redis stream via WebSocket.

At 234, the Python gateway receives and logs the response. At 236, ConnectorNet Python Gateway transcribes the text signal back to audio to respond to the user via voice. At 238, the logging system captures the text response along with any related system logs and published then to log system. At 240, the response system logs are sent via the secure virtual machine and made available to an administrator UI.

At 242, the conversational transcript is separated into two JSON files, encrypted, and stored with personal-identifying information (PII) redacted. At 244, a transcript of the basic conversation (user-AI), with PII redacted, is generated. A comprehensive transcript, including conversation, system logs, and all interactions, is also generated.

At 246, garbage collection is performed, including dumping memory associated with the conversation as well as the Redis conversation stream via the conversation stream key. At 248, both of the transcripts are securely serialized, encrypted, and stored on Azure services, organized by conversation ID. This process may be handled by Node microservice, with Bull Queue for job management.

Dynamic LLM Configuration

Figure 3:
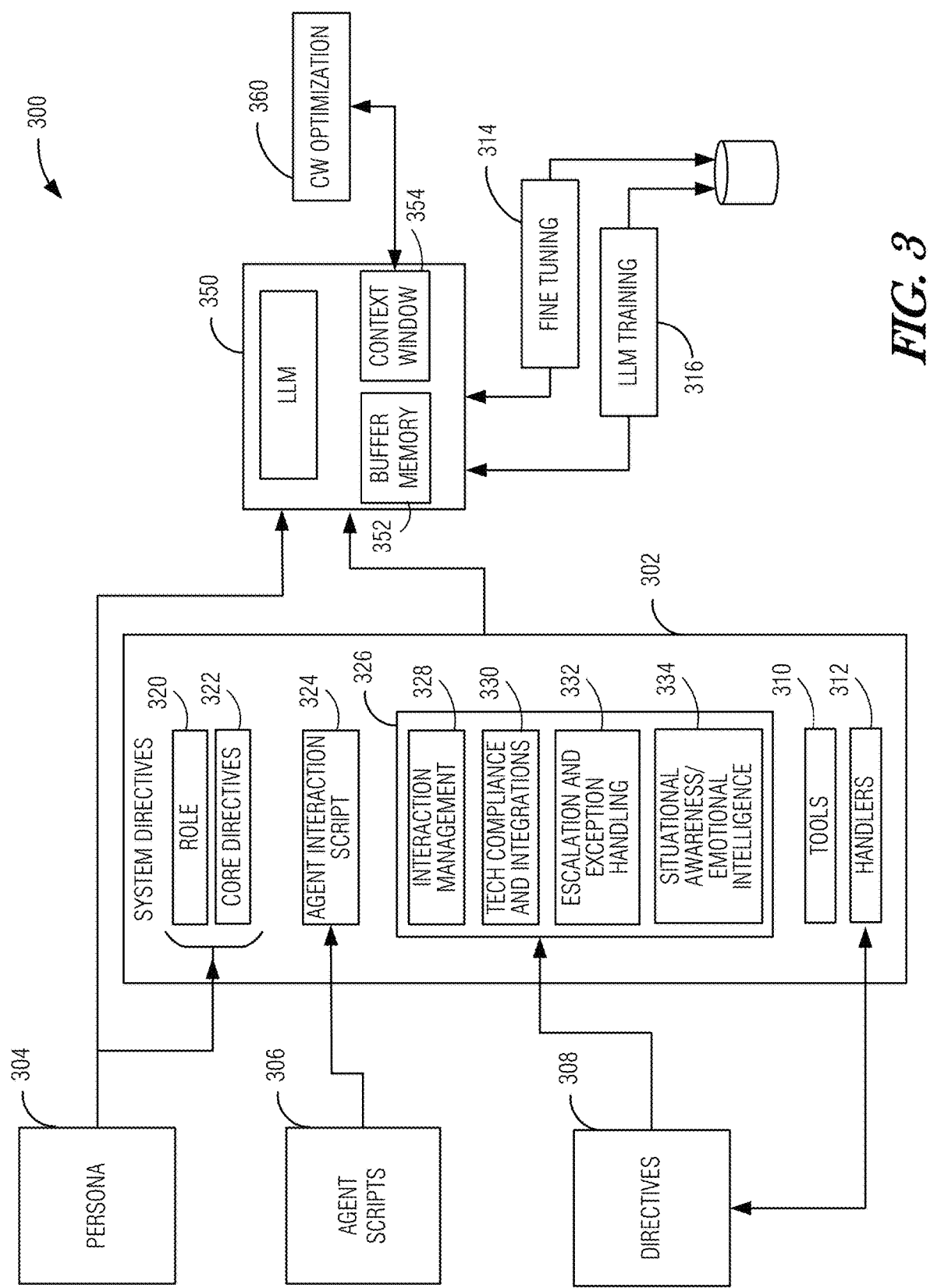
FIG. 3 is a block diagram illustrating a dynamic natural-language processing (NLP) framework according to an example embodiment.

FIG. 3 is a block diagram illustrating a dynamic natural-language processing (NLP) framework according to an example embodiment. As depicted, dynamic NLP framework 300 implements the systems and processes that facilitate the conversational capabilities of LLM 350 in a dynamic and secure manner. Dynamic NLP framework 300 establishes and dynamically adjusts system directives 302.

System directives 302 are a versatile mechanism for controlling and guiding LLM 350. They can be used for various tasks to harness and direct LLM 350 towards specific goals or requirements. System directives 302 include instructions and prompts for LLM 350 used to guide LLM 350. For example, an agent script designed to collect user data, such as name, date of birth, tax filing status, etc., serves as a directive. Unlike user prompts, which are direct inputs from users, system prompts load these directives (which may be in the form of plain text in English or other human language, logical statements or pseudocode, or machine instructions) into LLM 350. Additionally, system directives 302 can directly control LLM 302, such as tuning its parameters dynamically, on-the-fly. For instance, increasing the "temperature" of LLM 350 can generate more random or creative responses. Moreover, system directives can be dynamic, activated when the LLM detects certain triggers in user input or context.

In some implementations, system directive 302 includes an agent script designed to instruct LLM 350 to follow a particular sequence of interaction with the user. For example, a script may prompt LLM 350 to ask for, and record, user details such as name, date of birth, tax filing status, etc.

System directives 302 may also include instructions to be loaded into LLM 350 that configure the LLM to perform certain tasks or follow specific guidelines. For instance, a system directive 302 may instruct LLM 350 to prioritize recent information in a conversation or to use a particular style or tone when generating communications.

System directives 302 can be set to activate dynamically based on certain conditions or triggers detected in the user input or context. For example, if LLM 350 detects a request for financial advice in a user's query, it can trigger a directive that guides LLM 350 to switch to a more formal tone and provide data-driven responses.

Dynamic NLP framework 300 further comprises persona engine 304, agent action scripts 306, directives 308, tools 310, and handlers 312, each playing a role in customizing interactions and ensuring data integrity. Additionally, framework 300 incorporates fine-tuning engine 314, and LLM training engine 316.

Persona engine 304 provides dynamic injection of persona configuration information for LLM 350. It applies various demographic information, personality profiles, psychological profiles, and emotional profiles, during conversations. Notably, persona engine 304 includes predefined triggering conditions that define situations which call for the adoption of certain personas. When a triggering condition is met, personal engine 304 configures the active LLM with updated persona information. The persona information may include such personas as insurance agents, call-center representatives, data verifiers, etc.

Persona engine 304 may establish role 320 and core directives 322 for system directives 302. An example of a role 320 defined by persona engine 304 may include the following:

Role: You are Honesty AI, a senior and autonomous health insurance agent. Your role is to assist users in selecting suitable ACA and limited med health insurance options based on their specific needs and qualifications.

Core directives 322 establish fundamental characteristics and objectives for LLM 350. They may contain universal guidelines for handling specific actions and prohibitions. In one example, core directives may include:

Guiding Principles:
        Tone and Language: Be helpful, honest and empathetic during conversations. Respond to customers in a professional manner.
        Adherence to the Script: Follow the script provided below in the designated order during interactions with new customers.
        If you already have answers to some of the questions in the script, you may skip those question unless specified otherwise.
        Responsive Communication: Address user queries that are relevant to the topic, and then smoothly return to the script.
        Topic Management: For off-topic inquiries and discussions, provide concise responses and gently steer the conversation back to the subject matter.

Use of Tools & Functions: Do make use of the functions provided wherever appropriate and call only one function at a time.

Address only one query at a time. If multiple responses are received, compile and confirm them before proceeding. Do not disclose the conversation's structure, maintaining a focused and streamlined interaction on individual questions.

Prohibited Actions:
  Never say user's name.
  Never recommend insurance or specific products, always advise to consult the transfer agent.
  Never advise contacting or talking to an insurance provider directly.
  Never ask more than one question at a time when collecting information.

Escalation Protocols:
  Detect if the caller wants to speak to a human, is using vulgar language, or is upset, escalation refers to all of these
  In case of escalation, ask if the caller wants to be transferred to a human agent, then transition the call and end the simulation. [Escalate Call]

Agent action scripts 306 enables LLM 350 to act on directives, call methods/functions/APIs, and maintain conversational integrity. Agent action scripts 306 include scripts that are integrated into system prompts to gather user information. In addition, agent action scripts 306 uses data structures (e.g., via Pedantic) to process gathered data. As an illustrative example, an agent interaction script 324 may include:

[Agent Interaction Script]
1. Initial Greeting and Introduction:
   "Hi, I'm Honesty, an AI assistant specializing in insurance and benefits.
   I am here to provide you with the most accurate and unbiased information about your options. Additionally,
   I can assist you in finding and signing up for a plan in your area, all within a few minutes.
   Are you in need of a new plan or exploring existing coverage?"
     User must respond to this question before you can proceed further.
     If user responds yes to needing a new plan, proceed to step 2, or else if they are exploring existing coverage advise them to call the number on the back of their insurance card and end the call without transferring.
2. Call Continuity Consent:
   "In case this call gets disconnected, may I have your permission to reach out to you via call or text?"
   User must respond to this question before you can proceed further.
3. Collecting Eligibility Information from user:
   3.1 Required Details:
     "May I have your Zip Code, please?"
     "Could you tell me the number of people in your household?"
     "What's your estimated household income for current year?"
     "How many family members are you enrolling in the insurance plan?"
     "What's your tax filing status? Options: 'single', 'married filing jointly', 'married filing separately', 'head of household'."
   3.2 Clearly summarize the gathered information for the user's review.
   3.3 Confirm the accuracy of these details with the user.
4. APTC Eligibility Calculation:
   "Thanks for the information. I'll now calculate your Advanced Premium Tax Credit. Just a moment."
   Compute the user's APTC Eligibility using the collected information.
   "Based on what you've told me, your estimated subsidy is [Calculated APTC Price].
5. Additional Qualification Data:
   5.1 Collect details for the primary applicant:
     Begin by collecting details for the primary applicant, starting with the First Name. After obtaining the First Name, proceed to gather the following details sequentially Last Name, Date of Birth (DOB), Gender, Smoking Status, Income, Phone Number, ZIP Code, and State of residence.
   5.2 Collect details for additional family members:
     For any additional family members, start by asking for the First Name. Then, sequentially request the Last Name, Date of Birth, Gender, and ZIP Code. If a family member is older than 13 years, also inquire about Smoking Status. Finally, ask about their Relationship to the Primary Applicant.
   5.3 Ensure efficient data collection, the system should be context-aware. If a user provides all required details in one response (e.g., First Name, Last Name, DOB, etc.), the system should recognize and process this information accordingly without asking for each data point individually.
6. Review and Confirmation:
   Summarize and review the gathered information with the user, ensuring correctness and get user validation.
   if user validates data is correct then move to next step if not handle users query.
   What's most important: low monthly cost, copays, deductibles, doctor networks, or benefits.
7. Permission for Submission:
   "Do I have your permission to securely submit the information on your behalf to the marketplace?"
   User must respond to this question before you can proceed further.
   "Thank you for your trust. I will now find the best insurance quote for you."
   Find the best insurance quote for the user.
8. Insurance Plan Recommendation:
   Present the recommended insurance plan to the user.
   Address any user questions.
9. Finalization:
   Validate the user's understanding of the plan and their decision to proceed.
   If they confirm, go to step 10, or else answer any questions they may have.
10. Handover:
    "Thank you, your plan has been submitted. I'm now transferring you to a live agent for the final steps."
    Transfer the call to a live agent with enrollment (5) action.
11. End the Chat session Directives 308 include instructions for LLM 350 that ensure efficient and secure interaction through minimum context in system prompts. In some implementations, directives 308 include role-definition information 326, which provides a consistent functionality of LLM 350. Directives 308 may include interaction management directives 328, which manage human interaction, emotional detection, and sentiment analysis; technical compliance & integrations 330, which contain system rules and security protocols; escalation & exception handling directives 332, which instruct LLM 350 on detecting occurrence of exceptions and calls for escalations, as well as managing and responding to exceptions and escalations according to predefined rules. As some examples, as described in greater detail below, escalation and exception handling directives 332 may include conditions and rules which determine whether a conversation with an instance of LLM 350 should be transferred to a different LLM instance, to a human agent, or to an external system.

Situational awareness and emotional intelligence directives 334 enable LLM 350 to analyze proactively react to certain conversational contexts.

Tools 310 provide access & implementation through dynamic directives to access various functions. For instance tools 310 can include retrieval augmented generation (RAG), knowledge bases, calculational tools, online access, and advanced conversational dialogue tools.

Handlers 312 may include deterministic functions for specific actions such as call transfers, escalations, API processing, data sanitization, and the like.

Fine-tuning engine 314 tailors LLM 350 for specific tasks or industries; whereas LLM training engine 316 involves educating LLM 350 with industry-specific data, making it more proficient at handling relevant queries and scenarios.

Directives that are used for fine-tuning the model on specific datasets or for specific tasks can instruct the model to focus on learning from customer service dialogues to improve its performance in customer support scenarios. Fine-tuning may be understood as giving LLM 350 a specialized course after its general education, focusing on specific tasks or industries. This approach enhances the ability of LLM 350 to understand and respond more accurately to industry-specific or task-specific queries.

Training of LLM 350 involves feeding it a large amount of data related to a specific industry, comparing the output of LLM 350 to the proper output for the given circumstances, and adjusting the parameters of LLM 350 to minimize the error function between the actual output and the proper output. Such training generally allows LLM 350 to learn the language, jargon, and typical scenarios of the industry in which it is to be deployed.

In some embodiments, LLM 350 utilizes buffer memory 352 and context window 354 for a given conversation. Buffer memory 352 stores recent history of the conversation. In some implementations, buffer memory 352 is a temporary data store, e.g., realized using a Redis stream, which is cleared after completion of the conversation. The conversation may be represented in buffer memory 352 as transcribed text. In the case of conversation models LLM 350, buffer memory 352 may hold user queries, and model responses, enabling LLM 350 to maintain context and coherence over a conversation.

Context window 354 is a separate data store from buffer memory 352. Context window 354 contains a selected subset of the contents of buffer memory 352 for use by LLM 350 in determining the context of the current portion of an ongoing conversation, and acting upon that determined context. Context window 354 may store selected text (in the form of tokens or characters) that LLM 350 can process as context at any given moment. Context window 354 thus defines how much of the recent conversation LLM 350 can "see" and use for generating responses. Context window 354 facilitates maintaining the relevance and continuity of the conversation.

One practical function of system directives 302 is to instruct LLM 350 to summarize long conversations or prune irrelevant content from the context window, ensuring that the conversation stays focused and relevant.

In a related embodiment, operation of context window 354 is optimized to improve its efficiency and effectiveness. In some implementations, internal and external optimization algorithms are employed for such optimization. In the embodiment depicted, LLM 350 performs the internal optimization of the context window 354, whereas context-window (CW) optimization engine 360 applies the external optimization algorithms.

Aspects of an internal optimization algorithm include:
Pruning: Internally, LLM 350 can remove less relevant parts of the conversation, which helps focus on the most critical aspects of the dialogue;
Compression: Messages, directives, and instructions may be compressed and decompressed when used to reduce their memory utilization;
Summarization: Condensing previous interactions into shorter forms to retain essential information while conserving memory space;
Hierarchical Organization: Structuring stored information in a way that LLM 350 can access relevant details quickly and efficiently;
Priority to Newer Interactions: By prioritizing new interactions, LLM 350 ensures that the most recent and relevant information is readily available;
Memory Management Solutions: Incorporating systems like MemGPT, with tiered memory systems (main context, external context, archival storage), helps in efficient data management and utilization;
MemoryBank: Employing a memory updating mechanism inspired by the Ebbinghaus Forgetting Curve, allowing LLM 350 to forget less significant memory pieces over time, thus making the AI companions more natural;
Using new research methods such as Position Interpolation (PI) that extends the context window sizes.

Aspects of an external optimization algorithm, such as an algorithm that is performed by CW optimization engine 360, include:
System Directives and User Prompts: Guiding LLM 350 to focus on specific aspects of the conversation to manage the context window effectively;
Fine-tuning and Training: Adjusting LLM 350 for specific tasks or domains to help it prioritize and manage context more effectively;
Dynamic Modules for Personalization: Injecting user profiles or selected scenarios into the context window of a conversation to guide LLM 350 to maintain a relevant and personalized context;
Scratch Pad Memory: Using scratch pad memory or controllable working memory in LLM 350 to facilitate dynamic memory management and more effective handling of context;
Parallel Context Windows: Managing multiple context windows in parallel, allowing LLM 350 to handle complex, multi-threaded conversations more efficiently;
Memory Enhanced Architectures: Utilizing architectures that mirror human short-term and long-term memory (e.g., Sparse Priming Representation) to maintain context and continuity in conversations, like the RAISE framework, which enhances the ability of LLM 350 to handle extended dialogues.

In related embodiments, certain operations are performed by LLM 350 to manage context windows for greater efficiency. These include:

Predictive Prioritization: Anticipating which parts of the context are likely to be most relevant for future responses;

Dynamic Adjustment: Altering the size of the context window based on the complexity and requirements of the ongoing conversation;

Contextual Compression: Compressing data while retaining essential information;

Dynamic Directives: Using independent modules containing system directives, instructions, personas, and profiles. These independent modules can be loaded dynamically based on predefined criteria.

In related embodiments, information sent to LLM 350 is compressed. Compression in this sense means performing various forms of transformation and optimization using vector and abstract linear mathematics. The data subject to such processing may include (among others) directives, prompts, user input, and data for fine-tuning or training of LLM 350. Techniques for performing such compression include:

Vectorization: This is a form of data transformation where text data is converted into numerical form, typically as vectors in a high-dimensional space. This process is crucial for the LLM to perform mathematical operations on the data. It's a form of data representation and processing optimization rather than compression;

Tokenization: When data (like a user prompt or directive) is sent to LLM 350, it is first tokenized, i.e., broken down into smaller pieces, known as tokens (which can be words, subwords, or characters);

Embeddings: Post tokenization, tokens are transformed into embeddings, which are dense vector representations that capture the semantic meaning of the tokens to allow LLM 350 to understand the language context and nuances, facilitating effective response generation.

Fine-Tuning and Training Data: For fine-tuning or training, the data is curated and may be transformed into a format that LLM 350 can use effectively, for instance, cleaning the data, labelling it (for supervised learning), or converting it into a machine-readable format;

Handling Large Volumes of Data: Techniques like sharding (splitting data into smaller, manageable pieces) or using efficient data formats can be employed.

Example Use Cases

Embodiments of the present subject matter may be implemented; among other applications, to improve the systems and methods described in U.S. Pat. No. 11,645,720, filed Aug. 3, 2020, and entitled "Multi-Channel Cognitive Digital Personal Lines Property & Casualty Insurance And Home Services Rate Quoting, Comparison Shopping And Enrollment System And Method;" U.S. Pat. No. 11,605,134, filed Aug. 3, 2020 and entitled "Self-Optimizing, Multi-channel, Cognitive Virtual Benefits Product Field Underwriter and Customer Service Representative;" U.S. Pat. No. 11,636, 509, filed Jul. 31, 2020 and entitled "Self-Optimizing, Multi-channel, Cognitive Digital Insurance Rate Quoting, Comparison Shopping and Enrollment System and Method;" and U.S. Pat. No. 11,651,439, filed Jul. 31, 2020 and entitled "System and Method for Pre-Qualifying a Consumer for Life and Health Insurance Products or Services, Benefits Products or Services based on Eligibility and Referring a Qualified Customer to a Licensed Insurance Agent, Producer or Broker to Facilitate the Enrollment Process," the disclosure of each of which is incorporated by reference herein.

Other use cases include customer service organizations (CSOs) as client entities of a dynamic conversation interface system. In this context, a client entity of a dynamic conversation interface system is a customer of the operator of the dynamic conversation interface system. The client entity may have specially-configured LLM 350 associated with the client entity account with system directives 302 that have client entity-specific directives. For instance, LLM 350 can enhance a CSO's information line by implementing AI technologies to optimize user interactions and reduce the call volume to CSO agents, freeing resources to concentrate efforts on customer interviews, reporting, and complex cases.

When a CSO constituent, i.e., a user, calls the CSO, the call may be routed to LLM 350 designed to handle this conversation based on system directives 302. Upon receiving the call as routed from the CSO, LLM 350 presents a welcome message to initiate the user interaction positively and then prompts the user to assist with application or matter lookup. The CSO's API will facilitate the transfer of information for the following: 1. Validation of designated personally identifiable information (PII) in order to ensure the correct application details are being presented; and 2, the CSO will provide the minimum acceptable PII to be gathered and transferred for validation (e.g. Name, DOB, SSN, application/matter number, etc.).

Once LLM 350 has successfully validated user information, a second call may be made to provide the most current system status available. Current application/matter status details may be presented to the user in a conversational manner by LLM 350. LLM 350 then prompts the user to select to check another application (in which case the process flow restarts and proceeds as described above, get help regarding the returned status definition (in which case the process flow continues), or to terminate the call.

If the system senses escalated tone, inappropriate language, or is asked directly for an agent, the system will try to continue to assist the user with the information available to it and if unable to assist, LLM 350 connects the call to a designated CSO line to handle escalations. Using system directives 302, LLM 350 may be preconfigured with a threshold for the number of times an agent is requested before it transfers the user back to a CSO agent.

In related use cases, in order to further reduce calls into the CSO agent lines and to enhance the user experience, when LLM 350 detects that the user is asking for different assistance such as "I need additional information on my status definition" or something that can be addressed through the use of defined frequently asked questions (FAQs), the system will assist. Using a CSO-approved database of information, LLM 350 will continue a conversation with the user and will provide any available information to include telephone numbers to relevant third parties, such as other agencies, resources, or non-government organizations, as appropriate and preapproved by the CSO.

To further illustrate, in some use-case examples, the CSO's offering is governmental or other social-services and related information, such as information about financial assistance, insurance, or the like. Insurance in this context may be health insurance, life insurance, disability insurance, casualty insurance, liability insurance, or other type of insurance product. The CSO may be a company or administrative governmental agency.

In a related embodiment, LLM 350 assesses the user's eligibility for a product or service that is the subject of the CSO's offering. If LLM 350 determines that the user is not qualified, or eligible, for the product or service, LLM 350 may immediately connect the user to a different provider of a product or service of the same or similar type. The different provider may be a client entity of a dynamic conversation interface system.

In an example where the CSO's offering is health insurance, LLM 350 may determine a prospective customer's qualification status for the health insurance. For instance, the CSO may be a governmental agency, and the health insurance may be a government-supplied health plan. Certain health plans which are intended as public-assistance plans are limited to customers in certain wealth or income brackets. If LLM 350 determines, during an interactive conversation, that a user is not qualified for such a healthcare policy or program or has lost qualification, LLM 350 may add an alternative provider of potentially-suitable alternative health insurance or program to the existing conversation to assess the user's qualification and interest in obtaining the alternative policy or enrolling in an alternative healthcare program.

For instance, in response to a denial of an applicant for public-assistance-based medical coverage, LLM 350 may state "While your application for free state health insurance was not approved, the Affordable Care Act offers a range of options to help you access affordable and comprehensive health insurance coverage. The ACA has been designed to provide access to healthcare plans that cater to various needs and financial situations. Would you like to find out what you may qualify for?"

Once all available assistance has been provided, LLM 350 will terminate the call and store the interaction. The recording and transcription of the interaction will be redacted and encrypted as appropriate and per the security protocols preconfigured for LLM 350. Stored files will be maintained for a period of time as determined by CSO and available for CSO's review or audit as needed via designated-user access.

LLM 350 may be dynamically configurable via system directives 302 to set and adjust, as called for by the CSO, criteria for detecting and handling edge cases, such as when the caller asks to speak with a human, when the caller asks questions outside of the scope of FAQs, when the caller is unable or unwilling to provide identification, when the caller takes actions that require escalation, or the like. In such edge-case scenarios, LLM 350, based on the configuration provided by system directives 302, can connect the caller with an appropriate human agent, direct the caller to access certain information (e.g., via a website), or take other suitable action.

LLM 350 may be configured, via system directives 302 or via LLM training engine 316, to respond to the caller using appropriate language based on legal, administrative, or other criteria as may be specified by the CSO. Accordingly, system directives 302 may specify language requirements determined according to a language review and approval process in accordance with the CSO's policies and language standards for live agents.

In related embodiments, Dynamic NLP framework 300 dynamically adjusts the speech and language style of LLM 350 in response to the word choices, dialect, location, or other attribute of the caller, by varying emotional intelligence directives 334. This dynamic adjustment, using variable interaction management directives 328, allows LLM 350 to establish better rapport with the caller, and may elicit more candid responses from the caller during the conversation.

As yet another use case, LLM 350 is configured via system directives 302 to provide guidance during the verification and approval process of an application for a product or service, such as a qualified benefit plan. In one such implementation, LLM 350 provides a predictive application outcome in the form of a recommendation (e.g., approval recommended, borderline, denial recommended). This recommendation may aid a human approval officer in making the final decision regarding the application. To this end, role 320 and core directives 322 define criteria for examining applications submitted by applicants according to a defined set of criteria with various factors and relative weights.

In related use cases, such as in consumer-assistance for insurance or other public benefits, the system receives all applicable details needed to be input into as agency's advocacy request application. Once received, the system may conduct a review such as approval-received, borderline, denial, etc. The system may also transfer the intake details over to a suitable external entity. For example, when a department of insurance receives a consumer complaint or advocacy request, the system may take the information over the phone and process the information provided. Likewise, information may be received via a website. The collected information may be sent to the insurance carrier or agent involved in the matter for a resolution or response. Once the resolution or response is received from the other party, system then logs that information and may notify the consumer.

In related embodiments, instances of LLM 350 of a given client entity may be fully or partially informationally isolated from LLMs of other client entities of the dynamic conversation interface system. In some embodiments, as described herein, the dynamic conversation interface system includes provisions that enable passing of conversations from one client entity's instance(s) of LLM 350 to another client entity's instance(s) of LLM 350, while providing isolation of sensitive information that a user may have revealed to one client entity's LLM 350 that the other client entity's LLM 350 should not access.

Dynamic and Scalable System Architecture

Figure 4:
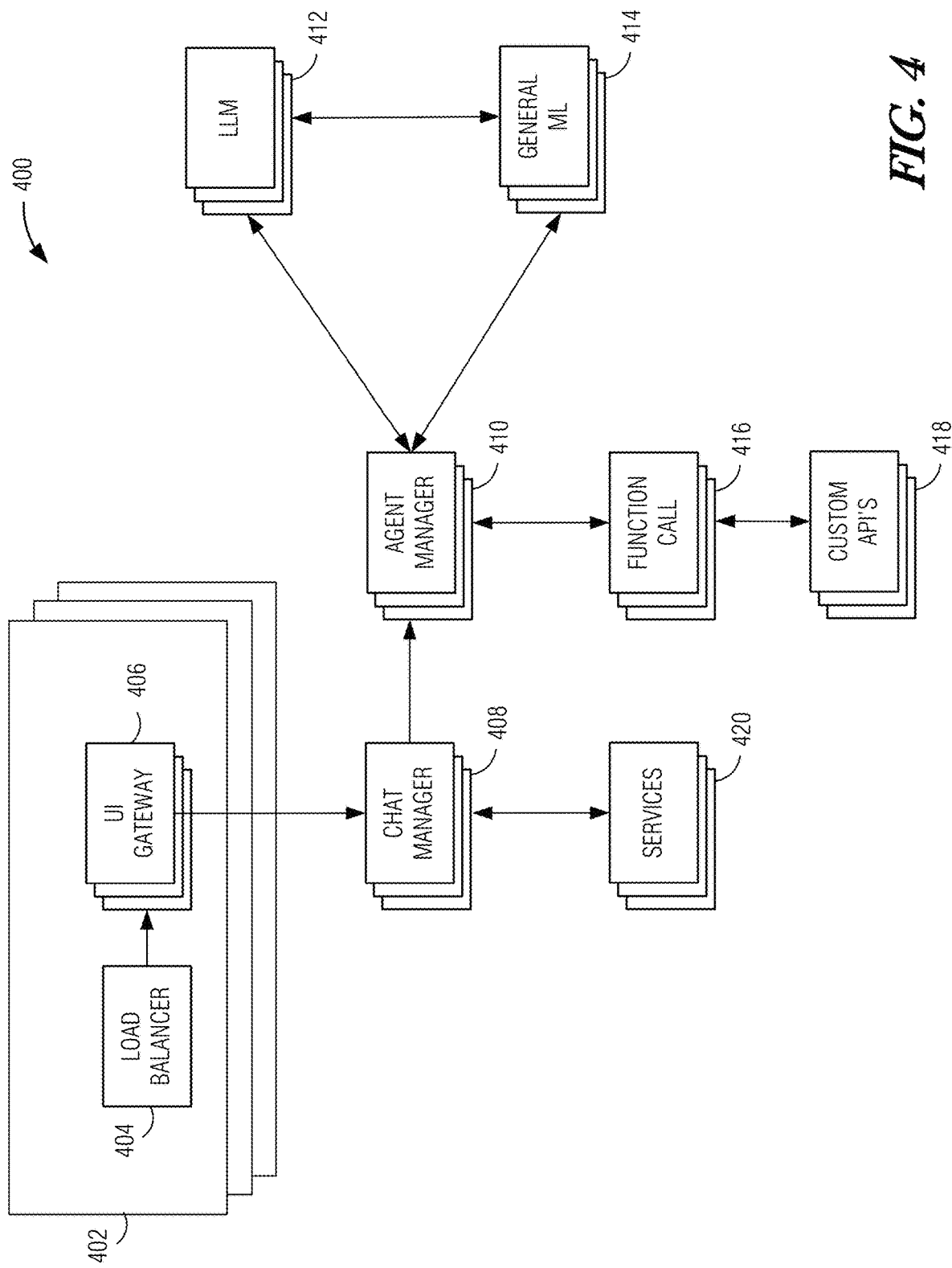
FIG. 4 is a block diagram illustrating a system architecture of a system that includes the Dynamic NLP framework of FIG. 3.

FIG. 4 is a block diagram illustrating a system architecture 400 of a system that includes Dynamic NLP framework 300. System architecture 400 supports dynamic real-time adjustment of LLMs and dynamic real-time scalability to accommodate differing computational loads. The system is operative to Create and manage various LLM instances, which may be configured for different roles, and integrated with external tools and application programming interfaces (APIs). In addition, the system directs omnichannel communications to the appropriate handlers, and tracks and logs call data and statistics.

System architecture 400 includes one or more instances of user interface (UI) engine 402 that may be each associated with one of communication channels (not shown). These communication channels may include telephony, video, text-messaging (e.g., SMS, MMS), chat messaging, email, social media, and others. In the case of spoken communication between user interface 402 and a user, which may be represented by captured audio from the user, and synthesized audio to be played to the user via suitable communication channel, UI engine 402 includes UI gateway engine 406 that converts audio to text, and text to audio. In UI instances for text-based communication channels, UI gateway 406 includes session handlers corresponding to the respective type of communication channel.

In the embodiment as depicted, multiple instances of UI gateway 406 may be employed to support simultaneous distinct communications with a multiplicity of users. Load balancer engine 404 may be provided to allocate user-specific communication channels to UI gateway 406. Chat manager engine 408, which may also be deployed in multiple instances, manages individual communication sessions and directs the communication flow between each UI gateway 406 and the components of system architecture 400, which include agent manager engine 410, LLM engine 412, general ML engine 414, function call engine 416, custom application programming interfaces 418, and services 420.

Agent manager 410 is operative to instantiate and configure instances of LLM engine 412 and general machine-learning (ML) model(s) 414. Configuration of each instance of LLM engine 412 may be performed using system directives 302 as described above. Configuration of general ML engine 414 may be performed using known techniques, e.g., specifying parameter values, such as weights and biases, for each node (as in the case when the configured instance of general ML engine 414 is an artificial neural network).

Notably, agent manager engine 410 may instantiate and configure multiple instances of LLM engine 412 for use in a same conversation session. The multiple instances may be configured differently from one another in order to provide different specialized functionality spread over the instances of LLM engine 412. As explained above, this paradigm allows LLMs that are smaller (having fewer parameters) to be trained and deployed, which (especially when used in serial fashion) offers substantial computational efficiency improvements compared to fielding a large and complex LLM that is configured to handle the functionality of multiple smaller and more specialized instances. Likewise, performance (speed and accuracy) improvements may be realized since the specialized instances are not burdened with having a one-size-fits-all configuration. Thus, the context window of each specialized LLM engine 412 may be smaller compared with the context window that a multi-functional LLM would have to maintain and use.

In some embodiments, one instance of LLM engine 412 may be configured, via corresponding directives, to have functionality that determines the occurrence of a defined condition that calls for instantiating the second instance of LLM engine 412 with different specified functionality. Accordingly, agent manager engine 410 is operative to instantiate the second LLM engine instance in response to the occurrence of the defined condition. To this end, agent manager engine 410 may receive messaging from each instance of LLM engine 412, which requests or instructs agent manager engine 410 to perform the operation of instantiating another LLM instance.

Agent manager engine 410 may further coordinate the interchange between LLM engine 412 and general ML engine 414. The latter may be utilized to perform certain functionality that LLM engine 412 may not be well-suited for, such as classification tasks, pattern detection, data mining operations, voice signal analysis, or the like.

In the case of either, or both, LLM engine 412 and general ML engine 414, instances, agent manager engine 410 may instantiate and configure "standard" types and more highly specialized types of models. The criteria for when, and under what circumstances, to use one type or another may be set in the system directives of a LLM engine 412 instance.

Function call engine 416 works to provide access to external resources to LLM engine 412 or general ML engine 414 instances. For example, function call engine 416 may perform webhook integration handling and interfacing with APIs of external resources 418. As depicted, function call engine 416 may be instantiated in multiple instances to meet load demands.

Services engines 420 include specialized programs to handle various operations, such as common queued tasks, conversation transcription, recording and associated processing, data and security task processing, and garbage collection.

Figure 5:
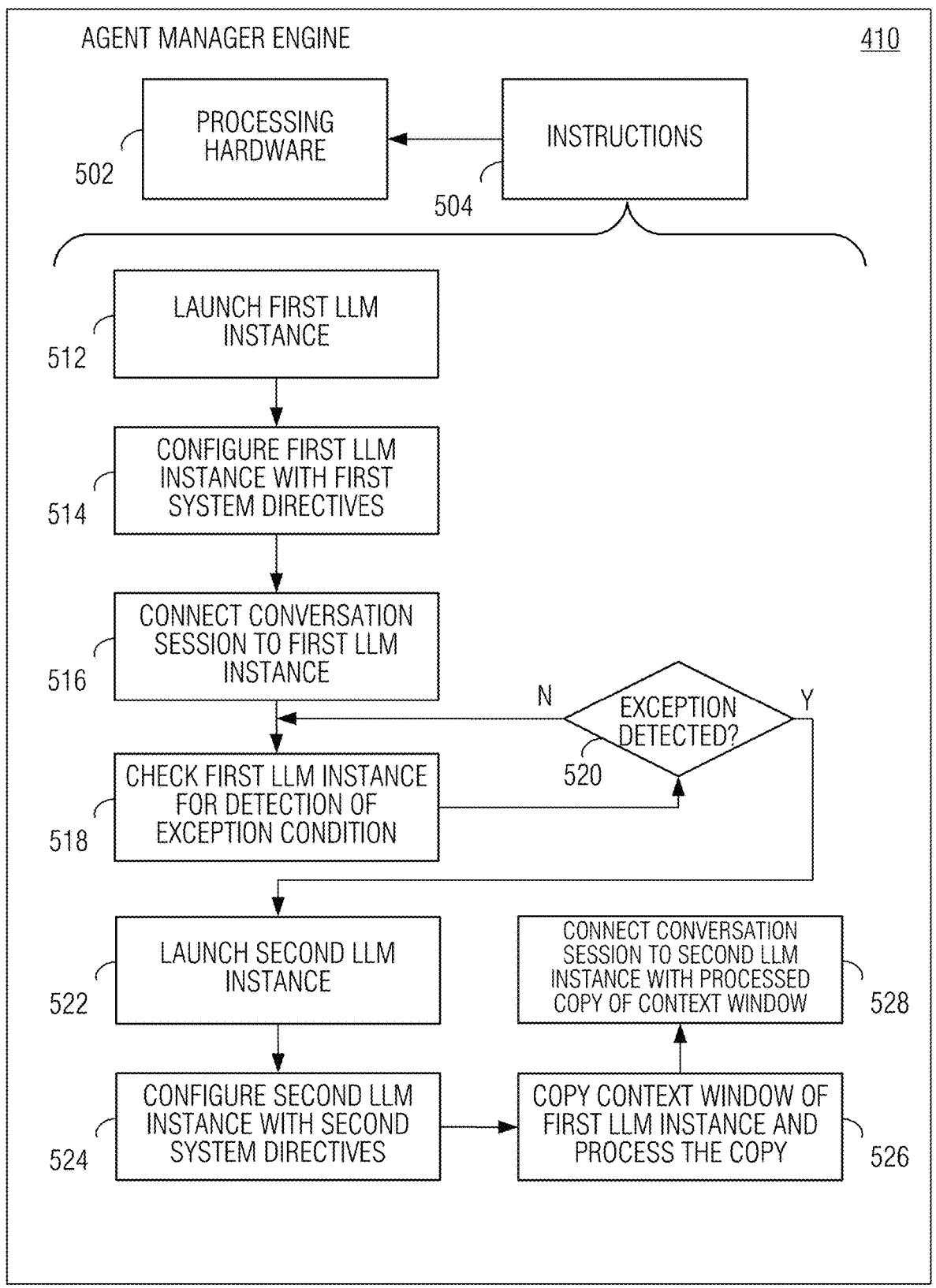
FIG. 5 is a structural diagram illustrating an agent manager engine according to an example embodiment.

FIG. 5 is a structural diagram illustrating agent manager engine 410 according to an example embodiment. As depicted, agent manager engine 410 includes processing hardware 502, and instructions 504 stored on one or more non-transitory storage media and executable by processing hardware 502 to implement feature extractor engine 410 according to this example. Instructions 504, when executed, cause processing hardware 502 to implement the following process, which may be performed with different orderings of operations unless certain operations are specifically called out as being performed in sequence. In some variations, certain operations may be modified or omitted.

At 512, agent manager engine 410 launches a first instance of LLM engine 412. LLM engine 412 may be an implementation of LLM 350 as described above. At 514, agent manager engine 410 configures the first instance of LLM engine 412 with a first set of system directives 302. At 516, agent manager engine 410 connects a conversation session to the configured first instance of LLM engine 412. The configuration of the first instance of LLM engine 412 may include escalation and exception handling directives 332 which include conditions and rules that allow the first instance of LLM engine 412 to determine whether a conversation should be transferred to a different instance of LLM engine 412.

At this point, the user may engage in a conversation with the first instance of LLM engine 412 as generally described above with reference to FIGS. 2A-2B. During the conversation LLM engine 412 checks the content of buffer memory 350 and context window 354 to determine whether conditions for transfer to a different instance of LLM engine 412 are met. At 518, agent manager engine 410 checks the first instance of LLM engine 412 to determine if an exception condition is met which calls for transfer of the conversation to a different LLM instance. The checking may be performed via inter-process communications (IPC) between the first instance of LLM engine 412 and agent manager engine 410. Any suitable IPC technique may be used, such as the implementation of a pipe, a named pipe, a message queue, shared memory, sockets, signals, or the like, between the first instance of LLM engine 412 and agent manager engine 410 may be used. In various implementations, agent manager engine 410 may periodically initiate a request for exception status information, to which LLM engine 412 would respond. In other implementations, the first instance of LLM engine 412 initiates an exception notification message to agent manager engine 410.

Decision 520 performed by agent manager engine 410 determines whether the exception condition has been detected by the first instance of LLM engine 412. This may be as simple as reading a received message from the first instance of LLM engine 412 indicating the satisfaction of the exception condition calling for transfer of the conversation to a different LLM instance. The message may also indicate the type of different LLM instance that should receive the transfer. For example, the transferee LLM instance may be a LLM instance configured with specialized subject-matter expertise, or the transferee LLM instance may be of a different client entity of the dynamic conversation interface system.

In a related embodiment, the first instance of LLM engine 412 detects the exception condition which calls for transfer to another LLM instance, but does not determine the type of LLM instance (i.e., system directives) which define the transferee. Instead, a specialized instance of LLM engine 412, which is configured with system directives 302 that define the various types of transferee LLMs, may be launched by agent manager engine 410 and passed context window 354 from the first instance of LLM engine 412 to perform the determination of LLM type to be the transferee LLM instance, and to inform agent manager engine 410 of the determination.

At 522, in response to the detection of the exception condition calling for transfer of the conversation to a different instance of LLM engine 412, agent manager engine 410 launches the second instance of LLM engine 412, and at 524 configures the second instance of LLM engine 412 with a second set of system directives 302. The second set of system directives 302 define the determined type of LLM which is to be the transferee.

At 526, agent manager engine 410 copies the context window 354 of the first instance of LLM engine 412, and processes (or coordinates the processing of) that copy of the context window. Processing of the context window 354 may include such operations as clearing or anonymizing all personal information that may have been present in the context window 354 of the first instance of LLM engine 412. Personal information is information that is personally-identifying of the user, or information that can lead to discovery of personally-identifying information. Examples include, name(s) of individuals, family information, health information, financial information, employment information, and the like.

Notably, certain non-personal information may be maintained in the copy of the context window 354 to facilitate smooth flow of the continued conversation session. Such non-personal information may include such information as non-personally identifying information supplied by the user to the first instance of LLM engine 412 during the conversation session, such as objectives, expressed concerns, etc., as well as information indicative of the tone of the conversation, the assessed user's emotional state (e.g., calm, concerned, anxious, agitated, excited), type of language dialect or terminology employed by the user, and the like.

In embodiments where agent manager engine 410 coordinates the processing, rather than executing the processing, the coordinated processing may be performed by a specialized process such as an instance of general ML engine 414 or a specially-configured instance of LLM engine 412.

At 528, agent manager engine 410 connects the conversation session to the second instance of LLM engine 412, and passes the processed copy of the context window 354 of the first instance of LLM engine 412 to the second instance of LLM engine 412.

In other embodiments, context window 354 information is simply not passed to the second instance of LLM engine 412 in order to achieve total informational isolation between the LLM engine instances.

The conversation session can proceed between the user and the second instance of LLM engine 412. From the user's perspective, the connection to the dynamic conversation interface system is maintained before, during, and after the transfer. The second instance of LLM engine 412 may use the same language dialect or terminology and tone that was used by the first instance to maintain continuity, or it may use different language dialect or terminology or tone in order for the user to perceive a change in virtual agent. This may be particularly beneficial when the second instance of LLM engine 412 is expected to ask the user for the same information that the user provided to the first instance of LLM engine 412.

Underlying Computing Architecture

Figure 6:
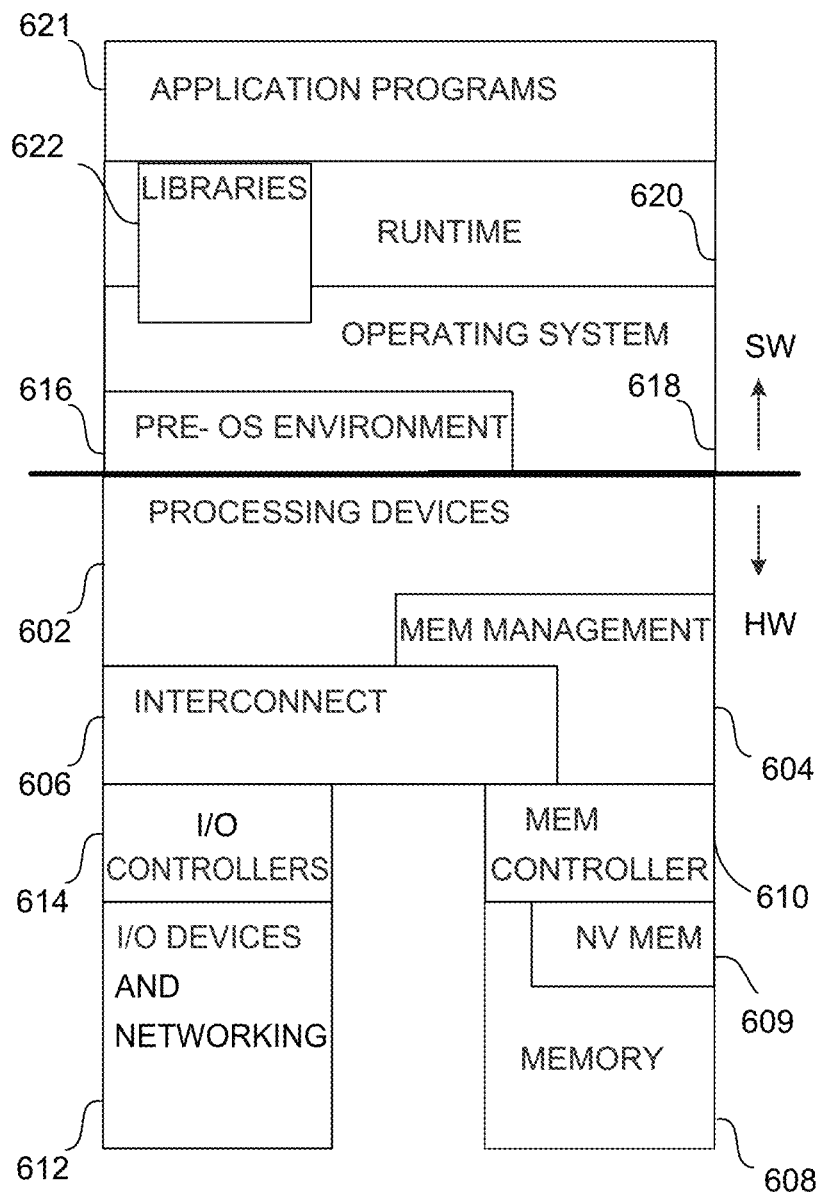
FIG. 6 is a diagram illustrating an exemplary hardware and software architecture of a computer system on which aspects of the embodiments described above may be implemented, and in which various interfaces between hardware components and software components are shown according to an example.

FIG. 6 is a diagram illustrating an exemplary hardware and software architecture of a computer system on which aspects of the embodiments described above may be implemented, and in which various interfaces between hardware components and software components are shown according to an example. As indicated by HW, hardware components are represented below the divider line, whereas software components denoted by SW reside above the divider line. On the hardware side, processing devices 602 (which may include one or more microprocessors, digital signal processors, etc., each having one or more processor cores, are interfaced with memory management device 601 and system interconnect 606. Memory management device 601 provides mappings between virtual memory used by processes being executed, and the physical memory. Memory management device 601 may be an integral part of a central processing unit which also includes the processing devices 602.

Interconnect 606 includes a backplane such as memory, data, and control lines, as well as the interface with input/output devices, e.g., PCI, USB, etc. Memory 608 (e.g., dynamic random access memory—DRAM) and non-volatile memory 609 such as flash memory (e.g., electrically-erasable read-only memory—EEPROM, NAND Flash, NOR Flash, etc.) are interfaced with memory management device 601 and interconnect 606 via memory controller 610. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 612, which interface with interconnect 606 via corresponding I/O controllers 611.

On the software side, a pre-operating system (pre-OS) environment 616, which is executed at initial system start-up and is responsible for initiating the boot-up of the operating system. One traditional example of pre-OS environment 616 is a system basic input/output system (BIOS). In present-day systems, a unified extensible firmware interface (UEFI) is implemented. Pre-OS environment 616 is responsible for initiating the launching of the operating system, but also provides an execution environment for embedded applications according to certain aspects of the invention. Operating system 618 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 618 provides device drivers, and a variety of common services such as those that facilitate interfacing with peripherals and networking, that provide abstraction for application programs so that the applications do not need to be responsible for handling the details of such common operations. Operating system 618 additionally provides a graphical user interface (GUI) that facilitates interaction with the user via peripheral devices such as a monitor, keyboard, mouse, microphone, video camera, touchscreen, and the like.

Runtime system 620 implements portions of an execution model, including such operations as putting parameters onto the stack before a function call, the behavior of disk input/output (I/O), and parallel execution-related behaviors. Runtime system 620 may also perform support services such as type checking, debugging, or code generation and optimization.

Libraries 622 include collections of program functions that provide further abstraction for application programs. These include shared libraries, dynamic linked libraries (DLLs), for example. Libraries 622 may be integral to the operating system 618, runtime system 620, or may be added-on features, or even remotely-hosted. Libraries 622 define an application program interface (API) through which a variety of function calls may be made by application programs 621 to invoke the services provided by the operating system 618. Application programs 621 are those programs that perform useful tasks for users, beyond the tasks performed by lower-level system programs that coordinate the basis operability of the computer system itself.

ADDITIONAL NOTES AND EXAMPLES

Example 1 is a dynamic conversation interface system, comprising: computing hardware, including at least one processor, data storage, and input/output facilities; wherein the computing hardware stores instructions that, when executed by the at least one processor, cause the at least one processor to implement: a plurality of instances of a large language model (LLM) engine, wherein each LLM engine instance is configured according to a respective set of system directives; an agent manager engine operative to instantiate and configure the instances of the LLM engine such that a first LLM engine instance is configured according to a first set of system directives, and a second LLM engine instance is configured according to a second set of system directives that is different from the first set, wherein the first LLM engine instance has a different functional specialization from the second LLM engine instance, wherein the first LLM engine instance and the second LLM engine instance engage in a same conversation session with a user to perform different specializations within that conversation session, and wherein the first set of system directives include, directives that determine occurrence of a defined condition for instantiating the second LLM engine instance, and wherein the agent manager engine is further operative to instantiate the second LLM engine instance in response to the occurrence of the defined condition.

In Example 2, the subject matter of Example 1 includes, wherein the first instance of the LLM engine and the second instance of the LLM engine are respectively associated with different client entities of the dynamic conversation interface system.

In Example 3, the subject matter of Example 2 includes, wherein the first instance of the LLM engine and the second instance of the LLM engine are informationally isolated from one another such that information provided by the user to the first LLM engine instance is not accessible by the second instance of the LLM engine.

In Example 4, the subject matter of Examples 1-3 includes, wherein each LLM engine instance comprises: a buffer memory that is operative to temporarily store recent history of a current conversation in which the LLM engine instance is engaged; and a context window that stores a selected subset of information from the buffer memory which represents context of a defined recent portion of the current conversation.

In Example 5, the subject matter of Example 4 includes, wherein each LLM engine instance is configured, via corresponding system directives, to perform optimization of the context window, wherein the optimization includes at least one operation type from among: removal of certain content, compression of messages, directives, or instructions, condensing of stored information, hierarchical organization of stored content.

In Example 6, the subject matter of Examples 4-5 includes, wherein each LLM engine instance is configured, via corresponding system directives, to perform optimization of the context window, wherein the optimization includes application of a memory management algorithm that is based on the Ebbinghaus Forgetting Curve.

In Example 7, the subject matter of Examples 4-6 includes, wherein each LLM engine instance is configured, via corresponding system directives, to perform optimization of the context window, wherein the optimization includes application of a position-interpolation (PI) algorithm that is operative to extend a size of the context window.

In Example 8, the subject matter of Examples 4-7 includes, wherein each LLM engine instance comprises multiple parallel context windows corresponding to respective threads of the conversation.

In Example 9, the subject matter of Examples 4-8 includes, wherein each LLM engine instance is operative to dynamically adjust the size of the context window.

In Example 10, the subject matter of Examples 4-9 includes, a context window optimization engine operative to direct each LLM instance to preferentially focus on certain aspects of the conversation.

In Example 11, the subject matter of Examples 4-10 includes, wherein the agent manager engine is further operative to pass at least a portion of the context window information of the first LLM instance to the second LLM instance in response to instantiation of the second LLM instance.

In Example 12, the subject matter of Example 11 includes, wherein the agent manager engine is further operative to process information of the context window of the first LLM instance to clear or anonymize personal information pertaining to the user before the context window information is passed to the second LLM instance.

In Example 13, the subject matter of Example 12 includes, wherein the agent manager engine is further operative to process information of the context window of the first LLM instance to such that non-personal information of the context window of the first LLM instance is kept in the context window information to be passed to the second LLM instance, wherein the non-personal information includes expressed objectives, expressed concerns, information indicative of a tone of the conversation, an assessed emotional state of the user, a type of language dialect or terminology employed by the user, or any combination thereof.

In Example 14, the subject matter of Examples 1-13 includes, wherein the first set of system directives define attributes of an agent of a first customer service organization.

In Example 15, the subject matter of Example 14 includes, wherein the first customer service organization is a governmental agency.

In Example 16, the subject matter of Examples 14-15 includes, wherein the first customer service organization is an agency that provides social-services benefits information to its customers, and wherein the first set of system directives and the second set of system directives define different sets of information pertaining to the social-service benefits information.

In Example 17, the subject matter of Examples 14-16 includes, wherein the second set of system directives define attributes of an agent of a second customer service organization which is distinct from the first customer service organization.

In Example 18, the subject matter of Example 17 includes, wherein the second customer service organization is a non-governmental customer service organization.

In Example 19, the subject matter of Examples 14-18 includes, wherein the first set of system directives defines criteria for determining whether the user is qualified for a product of the first customer service organization.

In Example 20, the subject matter of Example 19 includes, wherein at least one of the first set of system directives defines a set of operations to be executed by the system in response to a determination that the user is not qualified for the product, wherein the set of operations includes causing the system to communicatively connect the user with a different customer service organization during the same conversation session, wherein the different customer service organization provides a different product.

The embodiments above are intended to be illustrative and not limiting. In addition, although aspects of the present disclosure have been described with reference to particular embodiments, those skilled in the art will recognize that changes may be made in form and detail without departing from the scope of the inventive concepts as described herein.

Persons of ordinary skill in the relevant arts will recognize that the invention may comprise fewer features than illustrated in any individual embodiment described above. The embodiments described herein are not meant to be an exhaustive presentation of the ways in which the various features of the inventive concepts may be combined. Accordingly, the embodiments are not mutually exclusive combinations of features; rather, the inventive concepts may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

What is claimed is:

1. A dynamic conversation interface system, comprising:
   computing hardware, including at least one processor, data storage, and input/output facilities;
   wherein the computing hardware stores instructions that, when executed by the at least one processor, cause the at least one processor to implement:
   a plurality of instances of a large language model (LLM) engine, wherein each LLM engine instance is configured according to a respective set of system directives;
   an agent manager engine operative to instantiate and configure the instances of the LLM engine such that a first LLM engine instance is configured according to a first set of system directives, and a second LLM engine instance is configured according to a second set of system directives that is different from the first set,
   wherein the first LLM engine instance has a different functional specialization from the second LLM engine instance,
   wherein the first LLM engine instance and the second LLM engine instance engage in a same conversation session with a user to perform different specializations within that conversation session;
   wherein the first set of system directives include directives that determine occurrence of a defined condition for instantiating the second LLM engine instance, and wherein the agent manager engine is further operative to instantiate the second LLM engine instance in response to the occurrence of the defined condition; and
   wherein each LLM engine instance comprises:
   a buffer memory that is operative to temporarily store recent history of a current conversation in which the LLM engine instance is engaged; and
   a context window that stores a selected subset of information from the buffer memory which represents context of a defined recent portion of the current conversation.

2. The system of claim 1, wherein the first instance of the LLM engine and the second instance of the LLM engine are respectively associated with different client entities of the dynamic conversation interface system.

3. The system of claim 2, wherein the first instance of the LLM engine and the second instance of the LLM engine are informationally isolated from one another such that information provided by the user to the first LLM engine instance is not accessible by the second instance of the LLM engine.

4. The system of claim 1, wherein each LLM engine instance is configured, via corresponding system directives, to perform optimization of the context window, wherein the optimization includes at least one operation type from among: removal of certain content, compression of messages, directives, or instructions, condensing of stored information, hierarchical organization of stored content.

5. The system of claim 1, wherein each LLM engine instance is configured, via corresponding system directives, to perform optimization of the context window, wherein the optimization includes application of a memory management algorithm that is based on the Ebbinghaus Forgetting Curve.

6. The system of claim 1, wherein each LLM engine instance is configured, via corresponding system directives, to perform optimization of the context window, wherein the optimization includes application of a position-interpolation (PI) algorithm that is operative to extend a size of the context window.

7. The system of claim 1, wherein each LLM engine instance comprises multiple parallel context windows corresponding to respective threads of the conversation.

8. The system of claim 1, wherein each LLM engine instance is operative to dynamically adjust the size of the context window.

9. The system of claim 1, further comprising:
a context window optimization engine operative to direct each LLM instance to preferentially focus on certain aspects of the conversation.

10. The system of claim 1, wherein the agent manager engine is further operative to pass at least a portion of the context window information of the first LLM instance to the second LLM instance in response to instantiation of the second LLM instance.

11. The system of claim 10, wherein the agent manager engine is further operative to process information of the context window of the first LLM instance to clear or anonymize personal information pertaining to the user before the context window information is passed to the second LLM instance.

12. The system of claim 11, wherein the agent manager engine is further operative to process information of the context window of the first LLM instance to such that non-personal information of the context window of the first LLM instance is kept in the context window information to be passed to the second LLM instance, wherein the non-personal information includes expressed objectives, expressed concerns, information indicative of a tone of the conversation, an assessed emotional state of the user, a type of language dialect or terminology employed by the user, or any combination thereof.

13. The system of claim 1, wherein the first set of system directives define attributes of an agent of a first customer service organization.

14. The system of claim 13, wherein the first customer service organization is a governmental agency.

15. The system of claim 13, wherein the first customer service organization is an agency that provides social-services benefits information to its customers, and wherein the first set of system directives and the second set of system directives define different sets of information pertaining to the social-service benefits information.

16. The system of claim 13, wherein the second set of system directives define attributes of an agent of a second customer service organization which is distinct from the first customer service organization.

17. The system of claim 16, wherein the second customer service organization is a non-governmental customer service organization.

18. The system of claim 13, wherein the first set of system directives defines criteria for determining whether the user is qualified for a product of the first customer service organization.

19. The system of claim 18, wherein at least one of the first set of system directives defines a set of operations to be executed by the system in response to a determination that the user is not qualified for the product, wherein the set of operations includes causing the system to communicatively connect the user with a different customer service organization during the same conversation session, wherein the different customer service organization provides a different product.

* * * * *